March 13, 1951        L. F. WALLIS        2,544,868
FORMATION OF RUBBER TREADS ON VEHICLE TIRES
Filed Oct. 12, 1948
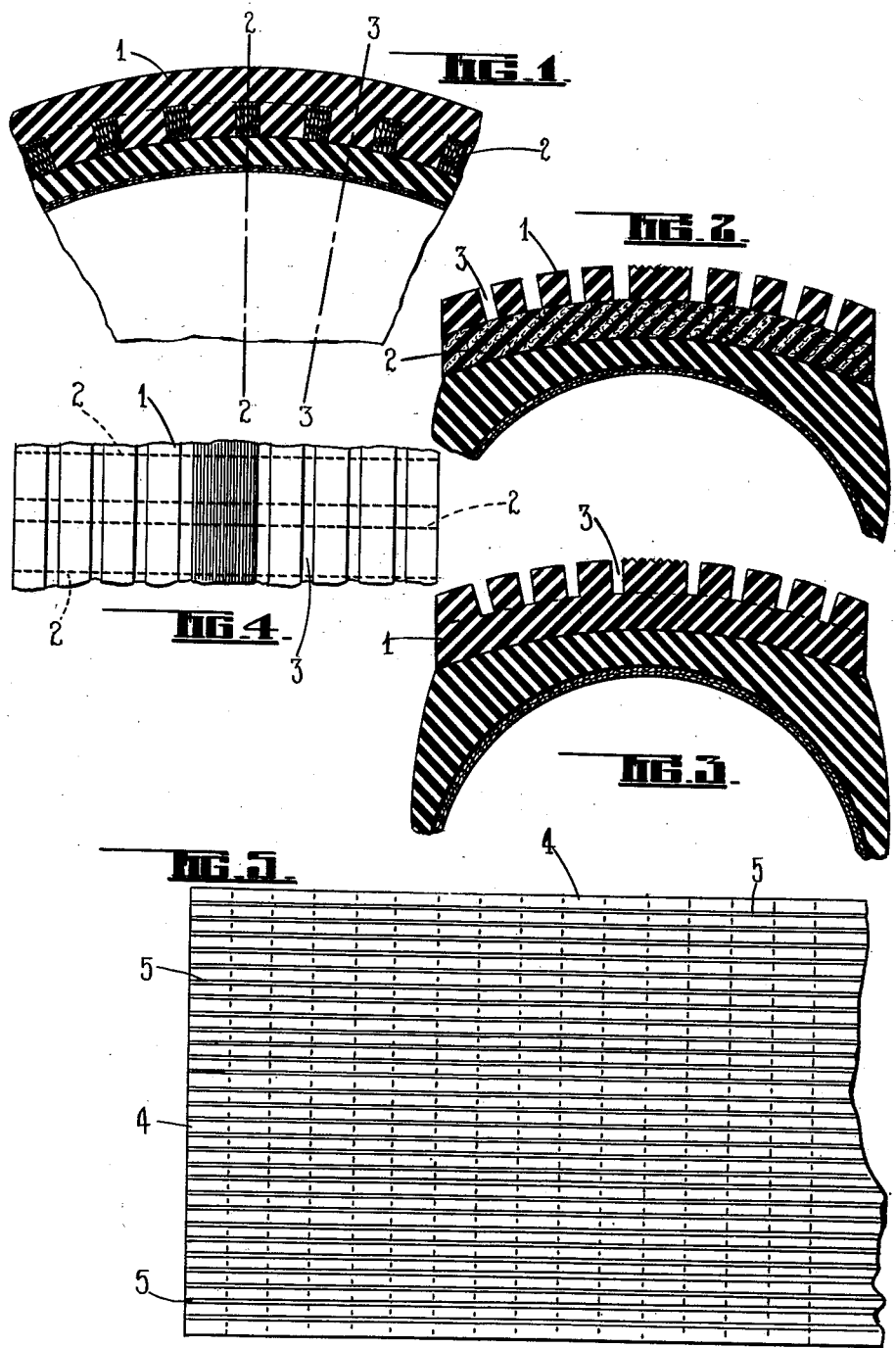
Inventor
L. F. Wallis Patented Mar. 13, 1951

2,544,868

UNITED STATES PATENT OFFICE 2,544,868

FORMATION OF RUBBER TREADS ON VEHICLE TIRES

Leonard Francis Wallis, Wellington, New Zealand

Application October 12, 1948, Serial No. 54,025
In New Zealand October 15, 1947

9 Claims. (Cl. 152—212)

The invention relates to the formation of rubber treads on tires for use on motor and other vehicles, and in connection with which it is known to provide a tire having a wearing or running surface consisting of thicknesses of rubber or rubber compound, separated by material comprising a plurality of thicknesses of rubber embedded cords extending through the tread from the wearing or running surface.

It is the object of the present invention, to provide an improved form of tread embodying the aforesaid construction so as to retain the advantages thereof, and one which will have the appearance of an ordinary tread, the improved form or tread upon wearing to a degree sufficient to remove the outer portion thereof, exposing the construction before referred to, thereby in effect, providing a dual tread tire, and obviating the formation of a smooth running surface on the latter at any time during the life of the tread.

It is also an object of the invention to provide an improved method of and means for facilitating the formation of the improved tread on tires.

Briefly, the invention consists in providing a vehicle tire, the tread portion of which comprises an initial wearing surface of rubber, and a secondary wearing surface adapted to be exposed upon the initial wearing surface being worn away, said secondary wearing surface consisting of thicknesses of rubber alternating with strips of flexible reinforcing material.

The invention further consists in forming the thicknesses of rubber comprised in the secondary wearing surface, integral with the rubber of the initial wearing surface, and also in providing exposed grooves in the initial wearing surface, and disposing the strips of flexible reinforcing material in the secondary wearing surface, so that the outer surfaces of said strips are located in line with the bottoms of the exposed grooves in the initial wearing surface.

The invention still further consists in forming the tread portion from a strip of rubber containing grooves in its inner surface, to receive the strips of flexible reinforcing material, the initial wearing surface being provided by the outer portion of said strip of rubber, and the secondary wearing surface by the strips of flexible reinforcing material, and the lands between said grooves.

Other features comprised in the invention will be apparent from the following detailed description read in conjunction with the accompanying drawing in which Figure 1 is a part sectional elevation of a tire formed in accordance with the invention, Figure 2 a part cross sectional view of the tire portion illustrated in Figure 1, taken on the line 2—2, Figure 1, Figure 3 a similar view to Figure 2, but taken on the line 3—3, Figure 1, Figure 4 a part surface view of the tire, and Figure 5 a view on a smaller scale of a sheet of rubber grooved in its inner surface, and from which strips can be cut to be used in the formation of the tread portion of the tire.

A tire provided with the improved form of tread, has an initial wearing surface of rubber 1 having incorporated therein, and being reinforced by, strips 2 of material, such as rubber embedded cords, commonly referred to in the art as canvas, which may be obtained from old tires, or be specially formed, the reinforcing strips 2 being disposed in the rubber 1, so that upon the latter being worn away to a predetermined degree there is exposed a secondary wearing surface consisting of thicknesses of the rubber 1, alternating with, or separated by, the reinforcing strips 2 aforesaid.

The initial wearing surface of the tread is given any suitable formation or design to guard against, or minimise, skidding of the tire while the latter is running on said initial wearing surface, so that at no time during the life of the improved tread, is the latter presented with a smooth running surface, in addition to which the improved tread is possessed of a useful life considerably in excess of any known form of tread, either of single or dual formation.

The rubber 1 comprised in the improved tread, extends from the initial wearing surface, to between the reinforcing strips 2 to, and is bonded with the tire, the outer surfaces of said reinforcing strips 2 being located in line with the bottoms of the depressions or grooves 3 in the initial wearing surface, so as to avoid the presence on the tread of a smooth running surface, upon the rubber between the depressions or grooves 3 in the initial wearing surface being worn away.

As regards the reinforcing strips 2 used in the formation of the improved tread, while it is preferred to form said strips 2 from material consisting of rubber embedded cords as aforesaid, any material of a flexible nature which will bond with or can be satisfactorily incorporated in the rubber 1 can be used, and in the case of the rubber embedded cords or fabric material, the same can be used end grainwise, or otherwise, although it is preferred to use said cords or fabric end grainwise, or with the ends of the cords or threads presented to the wearing surface of the tread.

A suitable method capable of being employed to enable tires to be provided with a tread of the form as aforesaid, is to utilise rubber in sheets 4 of suitable thickness, said sheets 4 having parallel grooves 5 formed in one surface, to receive reinforcing strips 2 aforesaid, the surface with the reinforcing strips 2 therein being coated with cementitious material, and covered with a layer of cushion gum of required thickness, following which the whole is cut at right angles to, or across the grooves 5 with the reinforcing strips 2 therein, as indicated by the dotted lines in Figure 5 to produce tread forming strips of the requisite width, either in one piece sufficient to encircle a tire, or in sections which combined, will encircle the tire, the tread forming strips or sections then being applied to the prepared surface of a tire, with the cushion gum presented to the latter, and the whole subjected to heat and pressure treatment in a suitable mould, during which any suitable tread formation or design is formed on the outer surface or surfaces of the tread forming strip or strips, which will provide the initial wearing surface of the tread.

It is convenient to extrude rubber in strips having grooves 5 separated by lands running lengthways therein, and to place a number of said strips of rubber side by side with the grooved sides uppermost, until a required dimension extending across or at right angles to the grooves 5 is obtained, following which the reinforcing strips 2 can be placed in the grooves 5, the cementitious material and the cushion gum being applied as before, and the whole cut across or at right angles to the grooves 5 and reinforcing strips 2, to produce tread forming strips or sections of the requisite width to suit the tire on which the improved tread is to be formed.

Another method capable of being employed to enable tires to be provided with a tread of the form aforesaid, is to utilise a sheet or strip of cushion gum of a suitable thickness and dimensions and place thereon in parallel arrangement reinforcing strips 2 of the kind before referred to, and strips of rubber, the latter alternating with the reinforcing strips 2 which have less depth or are shallower than the strips of rubber.

The reinforcing strips 2 are treated with cementitious material on selected or all of their surfaces, to cause, or to facilitate their adhesion to rubber surfaces, and or other surfaces with which they make contact during the formation of the tread, or can be formed and made to adhere in part to adjacent surfaces so as to enable air spaces to be created in said secondary wearing surface.

The cushion gum with the reinforcing strips 2 and the strips of rubber applied thereto as aforesaid, is then cut into strips of requisite width suitable for forming a tread on a tire, and applied to the prepared surface of the latter, so that the cushion gum is presented to the tire, the whole then being subjected to heat and pressure treatment in a mould, and during which treatment, in addition to the bonding of the components together and the bonding of the tread forming strips to the tire, the projecting strips of rubber flow or spread over the reinforcing strips 2 to form the initial wearing surface in a formation or design according to the matrix of the mould used.

It is to be understood that the reinforcing strips 2 are not restricted to incorporation in the tread in such manner that they are disposed only crossways of the latter, as the material from which the tread forming strips are ultimately produced, can be formed or cut to enable said tread forming strips to be produced with the reinforcing strips 2 extending through the length thereof, so as to enable a tire to have thereon a tread formed according to the invention, and in which the reinforcing strips 2 extend circumferentially around the tire, or so that said reinforcing strips 2 may be disposed obliquely across the tire.

What I do claim and desire to obtain by Letters Patent of the United States of America is:

1. A vehicle tire, the tread portion of which comprises, an initial wearing surface of rubber, and a secondary wearing surface adapted to be exposed upon the initial wearing surface being worn away, said secondary wearing surface consisting of thicknesses of rubber alternating with strips of flexible reinforcing material secured to the said thicknesses of rubber and each comprising rubber with cords embedded therein.

2. A vehicle tire the tread portion of which comprises, an initial wearing surface of rubber, and a secondary wearing surface adapted to be exposed upon the initial wearing surface being worn away, said secondary wearing surface consisting of thicknesses of rubber integral with the rubber of the initial wearing surface, alternating with separate strips of flexible reinforcing material secured to the said thicknesses of rubber and each comprising rubber with cords embedded therein.

3. A vehicle tire, the tread portion of which comprises, an initial wearing surface of rubber, having exposed grooves provided therein, and a secondary wearing surface adapted to be exposed upon the initial wearing surface being worn away, said secondary wearing surface consisting of thicknesses of rubber integral with the rubber of the initial wearing surface, alternating with reinforcing strips of flexible reinforcing material each comprising rubber with cords embedded therein, the outer surfaces of said latter strips being disposed flush with the bottoms of the grooves in the initial wearing surface.

4. A vehicle tire, the tread portion of which comprises, an initial wearing surface of rubber having exposed grooves provided therein, and a secondary wearing surface adapted to be exposed upon the initial wearing surface being worn away, said secondary wearing surface consisting of spaced thicknesses of rubber integral with the rubber of the initial wearing surface, alternating with separate spaced reinforcing strips respectively secured to said thicknesses of rubber adjacent thereto and each reinforcing strip comprising rubber having cords embedded therein extending therethrough from the inner to the outer surfaces thereof, the exposable surfaces of said strips extending flush with the bottoms of the grooves in the initial wearing surface.

5. A vehicle tire, the tread portion of which comprises an initial wearing surface of rubber having exposed grooves formed therein, and a secondary wearing surface adapted to be exposed upon the initial wearing surface being worn away, said secondary wearing surface consisting of spaced thicknesses of rubber integral with the rubber of the initial wearing surface, alternating with separate spaced reinforcing strips respectively secured to said thicknesses of rubber adjacent thereto and each reinforcing strip comprising rubber having cords individually embedded therein and extending therethrough from the inner to the outer surfaces thereof, the exposable surface of the reinforcing strips extending flush with the bottoms of the exposed grooves.

6. A vehicle tire, the tread portion of which comprises an initial wearing surface formed from a strip of rubber having grooves separated by lands in its inner surface, and a secondary wearing surface adapted to be exposed upon the initial wearing surface being worn away, said secondary wearing surface consisting of separate strips of rubber having flexible reinforcing material embedded therein secured in the grooves in the inner surface of said first strip of rubber, and the lands between said grooves.

7. A vehicle tire, the tread portion of which comprises an initial wearing surface of rubber, and a secondary wearing surface adapted to be exposed upon the initial wearing surface being worn away, said secondary wearing surface consisting of thicknesses of rubber alternating with strips of rubber having flexible reinforcing material embedded therein and secured in part to adjacent rubber surfaces so as to provide air spaces upon exposure and utilization of said secondary wearing surface.

8. A double wearing tread for tires comprising a first wearing surface composed of a rubber strip having a plurality of grooves separated by lands on the inner surface thereof and a secondary wearing surface including a plurality of strips of rubber each having cords individually embedded therein and each of said reinforcing strips being secured in said grooves and being coextensive in length with the depth of said groove so that the outer surface of said reinforcing strips is flush with the inner surface of the lands between the grooves of said first strip whereby the tread can be secured to a tire and the alternating lands of said first strip and the cord reinforced strips constituting said secondary wearing surface and exposable upon the wearing away of the outer portion of said first mentioned rubber strip.

9. A double wearing tread for tires as defined in and by claim 8 wherein said first mentioned wearing surface is also provided with grooves on the outer surface thereof.

LEONARD FRANCIS WALLIS.

REFERENCES CITED

The following references are of record in the file of this patent:

UNITED STATES PATENTS

| Number | Name | Date |
| --- | --- | --- |
| 1,014,912 | Shoemaker | Jan. 16, 1912 |
| 1,070,440 | Fisk | Aug. 19, 1913 |
| 1,077,618 | Maginnis | Nov. 4, 1913 |
| 1,254,844 | Chinnock | Jan. 29, 1918 |